(12) United States Patent
Pu et al.

(10) Patent No.: US 12,416,345 B2
(45) Date of Patent: Sep. 16, 2025

(54) STEWART VIBRATION ISOLATION PLATFORM WITH MACRO FIBER COMPOSITE PLATES AND CONTROL METHOD THEREOF

(71) Applicant: Shanghai University, Shanghai (CN)

(72) Inventors: Huayan Pu, Shanghai (CN); Xuan Fang, Shanghai (CN); Min Wang, Shanghai (CN); Yi Sun, Shanghai (CN); Jiheng Ding, Shanghai (CN); Yan Peng, Shanghai (CN); Shaorong Xie, Shanghai (CN); Jun Luo, Shanghai (CN)

(73) Assignee: SHANGHAI UNIVERSITY, Shanghai (CN)

( * ) Notice: Subject to any disclaimer, the term of this patent is extended or adjusted under 35 U.S.C. 154(b) by 781 days.

(21) Appl. No.: 17/687,415

(22) Filed: Mar. 4, 2022

(65) Prior Publication Data
US 2022/0282766 A1 Sep. 8, 2022

(30) Foreign Application Priority Data

Mar. 5, 2021 (CN) .......................... 202110245225.3

(51) Int. Cl.
*F16F 15/08* (2006.01)
*F16F 15/00* (2006.01)
*B64G 1/22* (2006.01)

(52) U.S. Cl.
CPC ............ *F16F 15/002* (2013.01); *F16F 15/08* (2013.01); *B64G 1/22* (2013.01); *F16F 2228/04* (2013.01);
(Continued)

(58) Field of Classification Search
CPC ...... F16F 15/002; F16F 15/08; F16F 2228/04; F16F 2228/066; F16F 2230/18; B64G 1/22
(Continued)

(56) References Cited

U.S. PATENT DOCUMENTS 6,022,005 A * 2/2000 Gran ....................... F16F 15/02
244/164
8,444,121 B2 * 5/2013 Hadden ............... F16F 15/0232
267/136
(Continued)

FOREIGN PATENT DOCUMENTS

| CN | 105204543 A | * | 12/2015 | ............. G05D 19/02 |
| CN | 106842546 A | * | 6/2017 | ............. F16F 15/002 |
| CN | 109296688 A | * | 2/2019 | ................ F16F 7/00 |

*Primary Examiner* — Christopher P Schwartz
(74) *Attorney, Agent, or Firm* — MARSHALL, GERSTEIN & BORUN LLP

(57) ABSTRACT

The present disclosure discloses a Stewart vibration isolation platform with Macro Fiber Composite (MFC) plates. The vibration isolation platform includes: an upper load platform, a lower foundation platform, a controller, and a plurality of single-leg vibration isolation unit groups arranged between the upper load platform and the lower foundation platform. Each of the single-leg vibration isolation unit groups includes two single-leg vibration isolation units. The single-leg vibration isolation unit includes a first diaphragm spring and a second diaphragm spring. An MFC actuator and an MFC sensor are respectively arranged on two sides of the first diaphragm spring and the second diaphragm spring. The MFC actuators and the MFC sensors are all connected to the controller.

7 Claims, 9 Drawing Sheets

(52) U.S. Cl.
CPC ..... *F16F 2228/066* (2013.01); *F16F 2230/18* (2013.01)

(58) Field of Classification Search
USPC ......... 188/378–380; 248/550, 562, 636–638; 267/136
See application file for complete search history.

(56) References Cited

U.S. PATENT DOCUMENTS

| | | | |
|---|---|---|---|
| 9,777,793 B1* | 10/2017 | Chen | G05B 19/402 |
| 11,692,607 B2* | 7/2023 | Pu | H02N 15/00 |
| | | | 73/35.09 |
| 11,927,235 B2* | 3/2024 | Pu | F16F 15/005 |
| 12,215,752 B1* | 2/2025 | Steg | B64G 1/66 |
| 2013/0154170 A1* | 6/2013 | Davis | B64G 1/6425 |
| | | | 267/136 |

* cited by examiner

STEWART VIBRATION ISOLATION PLATFORM WITH MACRO FIBER COMPOSITE PLATES AND CONTROL METHOD THEREOF

CROSS-REFERENCE TO RELATED APPLICATION(S)

This patent application claims the benefit and priority of Chinese Patent Application No. 202110245225.3, filed on Mar. 5, 2021, the disclosure of which is incorporated by reference herein in its entirety as part of the present application.

TECHNICAL FIELD

The present disclosure relates to the technical field of vibration isolation devices, and in particular, to a Stewart vibration isolation platform with Macro Fiber Composite (MFC) plates and a control method thereof.

BACKGROUND ART

At present, remote sensing satellites are mostly used to investigate and analyze environmental resources, natural disasters, urban planning, and the like. When optical equipment carried by a remote sensing satellite works in a space orbit, it is often affected by parts rotating at a high speed, such as a swing part and a momentum wheel. These factors will cause micro-vibration of a remote sensing satellite imaging system, which greatly restricts the quality of remote sensing satellite imaging. Therefore, it is imperative to research a vibration isolation technology of precision equipment such as remote sensing satellite optical equipment.

A traditional passive vibration isolation technology is simple in structure and stable in operation, but the vibration isolation effect is difficult to meet actual use requirement.

SUMMARY

An objective of the present disclosure is to provide a Stewart vibration isolation platform with MFC plates and a control method thereof, so as to improve the vibration isolation effect in an active vibration isolating manner.

To achieve the above-mentioned objective, the present disclosure provides the following solutions.

The present disclosure provides a Stewart vibration isolation platform with MFC plates. The vibration isolation platform includes: an upper load platform, a lower foundation platform, a controller, and a plurality of single-leg vibration isolation unit groups arranged between the upper load platform and the lower foundation platform. Each of the single-leg vibration isolation unit groups includes two single-leg vibration isolation units.

Each single-leg vibration isolation unit includes a first diaphragm spring and a second diaphragm spring. An MFC actuator and an MFC sensor are respectively arranged on two sides of each of the first diaphragm springs and the second diaphragm springs.

The MFC actuators and the MFC sensors are all connected to the controller.

Optionally, there are three single-leg vibration isolation unit groups. The three single-leg vibration isolation unit groups are distributed in the peripheral direction of the upper load platform and the lower foundation platform.

Optionally, a plurality of upper groove groups are formed in a lower surface of the upper load platform. Each of the upper groove groups includes two upper grooves. A first threaded through hole is formed in each of the upper grooves. A plurality of lower groove groups are correspondingly formed in an upper surface of the lower foundation platform. Each of the lower groove groups includes two lower grooves. A second threaded through hole is formed in each of the lower grooves.

An upper end of the single-leg vibration isolation unit is clamped in the upper groove, and is fixed to the upper load platform through the first threaded through hole. A lower end of the single-leg vibration isolation unit is clamped in the lower groove, and is fixed to the lower foundation platform through the second threaded through hole.

Optionally, the single-leg vibration isolation unit includes an upper mounting corner seat, a first long mounting rod, a first short mounting rod, a first diaphragm spring, a second diaphragm spring, a second short mounting rod, a second long mounting rod, and a lower mounting corner seat.

One side of the upper mounting corner seat is fixedly connected to the lower surface of the upper load platform. The other side of the upper mounting corner seat is fixedly connected to one end of the first long mounting rod. The other end of the first long mounting rod is fixedly connected to one end of the second short mounting rod.

One side of the lower mounting corner seat is fixedly connected to the upper surface of the lower foundation platform. The other side of the lower mounting corner seat is fixedly connected to one end of the second long mounting rod. The other end of the second long mounting rod is fixedly connected to one end of the second short mounting rod.

One end of the first diaphragm spring is fixed between the first long mounting rod and the first short mounting rod. The other end of the first diaphragm spring is fixed to the other end of the second short mounting rod by a bolt.

One end of the second diaphragm spring is fixed between the second long mounting rod and the second short mounting rod. The other end of the second diaphragm spring is fixed to the other end of the first short mounting rod by a bolt.

The MFC sensors are pasted on the opposite sides of the first diaphragm spring and the second diaphragm spring. The MFC actuators are pasted on the other sides of the first diaphragm spring and the second diaphragm spring.

Optionally, external screw threads are formed in one end of each of the first long mounting rod, the first short mounting rod, the second long mounting rod, and the second short mounting rod. A first threaded hole with internal screw threads is formed in the other end of each of the first long mounting rod, the first short mounting rod, the second long mounting rod, and the second short mounting rod.

Optionally, both the upper mounting corner seat and the lower mounting corner seat are prismatic structures with chamfered cross sections.

The chamfered cross section is a cross section formed by crosscutting a first straight line on an end surface of a prismatic structure and a second straight line on a side surface of a prism. The first straight line is parallel to the second straight line.

A second threaded hole is formed in the chamfered cross section. The second threaded hole is used to fix one end of the first long mounting rod or the second long mounting rod.

A third threaded hole is formed in a non-crosscutting end surface of the prismatic structure. The third threaded hole is used to fix the upper mounting corner seat to the lower surface of the upper load platform or fix the lower mounting corner seat to the upper surface of the load foundation platform.

Optionally, both the first diaphragm spring and the second diaphragm spring are of plate beam structures. Through holes are formed in two ends of each plate beam structure.

A control method of a Stewart vibration isolation platform with MFC plates is applied to the vibration isolation platform. The control method includes the following steps:

acquiring vibration deformation signals connected by MFC sensors on each first diaphragm spring and each second diaphragm spring;

respectively determining a control quantity required for eliminating each vibration deformation signal by a Radial Basis Function (RBF) neural network algorithm, a PI (Proportional Integral) force control algorithm, an adaptive Recursive Least Square (RLS) algorithm and/or an adaptive Least Mean Square (LMS) algorithm; and respectively controlling the MFC actuators on each of the first diaphragm springs and each of the second diaphragm springs according to the control quantities required for eliminating each of the vibration deformation signals.

Optionally, an RBF neural network of the RBF neural network algorithm includes an input layer, a hidden layer, and an output layer.

A node transfer function of the hidden layer is a Gaussian function, and a node transfer function of the output layer is a linear function.

According to specific embodiments provided by the present disclosure, the present disclosure discloses the following technical effects.

The present disclosure discloses the Stewart vibration isolation platform with the MFC plates. The vibration isolation platform includes: the upper load platform, the lower foundation platform, the controller, and the plurality of single-leg vibration isolation unit groups arranged between the upper load platform and the lower foundation platform. Each of the single-leg vibration isolation unit groups includes two single-leg vibration isolation units. Each single-leg vibration isolation unit includes the first diaphragm spring and the second diaphragm spring. The MFC actuators and the MFC sensors are respectively arranged on the two sides of each of the first diaphragm springs and the second diaphragm springs. The MFC actuators and the MFC sensors are all connected to the controller. According to the present disclosure, the vibration deformation signals on the first diaphragm springs and the second diaphragm springs are collected through the MFC sensors and are sent to the controller, and the controller determines the control quantity required for eliminating the vibration deformation signals and controls the MFC actuators, so that active vibration isolation is realized, and the vibration isolation effect is improved.

BRIEF DESCRIPTION OF THE DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and those of ordinary skill in the art may still derive other drawings from these accompanying drawings without creative efforts.

FIG. 7A is a schematic diagram of an action mechanism of a traditional passive vibration isolation platform; FIG. 7B is a schematic diagram of an action mechanism of the Stewart vibration isolation platform with the MFC plates of the present disclosure;

DETAILED DESCRIPTION OF THE EMBODIMENTS

Technical solutions in the embodiments of the present disclosure will be clearly and completely described herein below with reference to the drawings in the embodiments of the present disclosure. Apparently, the described embodiments are merely part rather than all of the embodiments of the present disclosure. On the basis of the embodiments of the present disclosure, all other embodiments obtained by those of ordinary skill in the art without creative work fall within the scope of protection of the present disclosure.

An objective of the present disclosure is to provide a Stewart vibration isolation platform with MFC plates and a control method thereof, so as to improve a vibration isolation effect in an active vibration isolation manner. That is, the vibration isolation platform and the control method thereof provided by the present disclosure are used to solve a problem of interference of precision equipment under micro-vibration. The vibration isolation platform adopts MFCs to serve as a sensor and an actuator to construct an active control vibration isolation system.

In order to make the abovementioned objective, features, and advantages of the present disclosure more apparent and more comprehensible, the present disclosure is further described in detail below with reference to the drawings and specific implementation manners.

Figure 1:
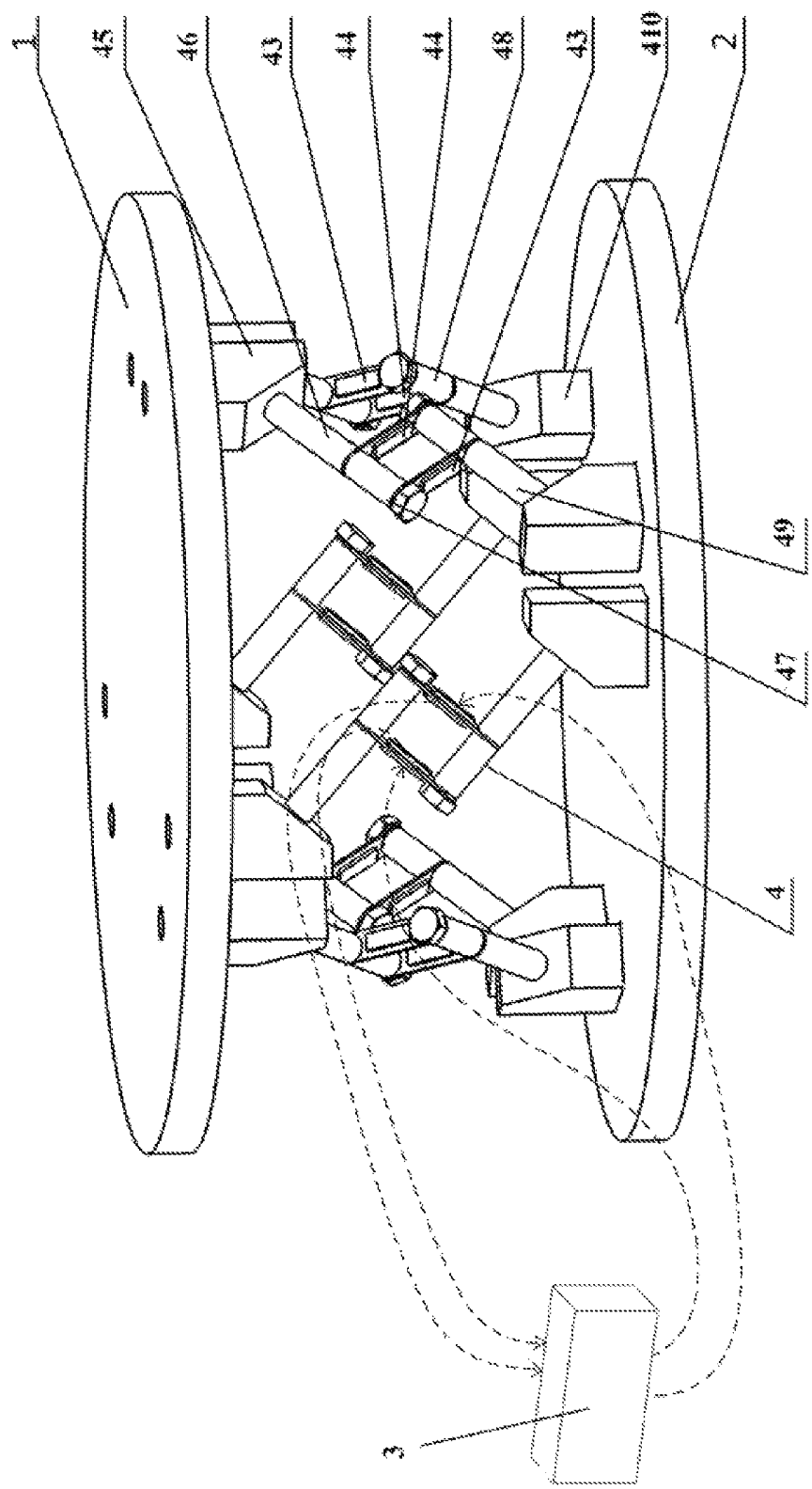
FIG. 1 is a structural diagram of a Stewart vibration isolation platform with MFC plates provided by the present disclosure.

As shown in FIG. 1, the present disclosure provides a Stewart vibration isolation platform with MFC plates. The vibration isolation platform includes: an upper load platform 1, a lower foundation platform 2, a controller 3, and a plurality of single-leg vibration isolation unit groups arranged between the upper load platform and the lower foundation platform. Each of the single-leg vibration isolation unit groups includes two single-leg vibration isolation units 4.

A first diaphragm spring 41 and a second diaphragm spring 42 are arranged on the single-leg vibration isolation unit 4. An MFC actuator 43 and an MFC sensor 44 are respectively arranged on two sides of each of the first diaphragm springs 41 and the second diaphragm springs 42. The MFC actuators 43 and the MFC sensors 44 are all connected to the controller 3. The MFC sensors 44 on each first diaphragm spring 41 and each second diaphragm spring 42 are used to collect vibration deformation signals on each of the first diaphragm springs 41 and the second diaphragm springs 42, and send the vibration deformation signals to the controller 3. The controller 3 is used to determine a control quantity required for eliminating each vibration deformation signal, and control the MFC actuators 43 on each first diaphragm spring 41 and each second diaphragm spring 42, so as to eliminate a vibration deformation quantity on each first diaphragm spring 41 and each second diaphragm spring 42.

The MFC is a novel functional composite, can drive and sense by using a piezoelectric effect, and has the advantages of small size, quick response, simple driving, and the like, and is mainly applied to the occasions with large load and high strain.

There are three single-leg vibration isolation unit groups. The three single-leg vibration isolation unit groups are distributed in the peripheral direction of the upper load platform and the lower foundation platform.

The upper load platform 1 of the present disclosure is an annular plate. An Upper grooves and first threaded through holes are formed in the lower surface. The upper grooves are used to locate the single-leg vibration isolation units, and the upper load platform 1 is connected to the single-leg vibration isolation units 4 through countersunk head screws. The structure of the lower foundation platform of the present disclosure is similar to that of the upper load platform. There are six single-leg vibration isolation units in the present disclosure in total and every two single-leg vibration isolation units form a group. The groups are uniformly distributed along the circumference of the annular plate at an interval of 120°. The single-leg vibration isolation unit may be used as passive vibration isolation or may be added with a controller for active vibration isolation.

Figure 2:
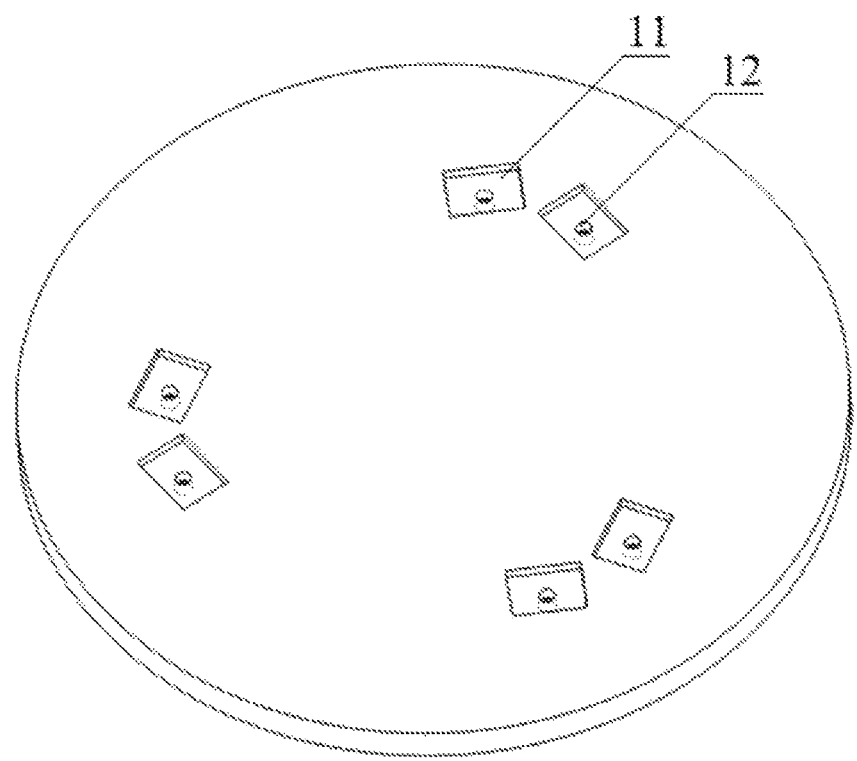
FIG. 2 is a three-dimensional structure of an upper load platform provided by the present disclosure.

Specifically, as shown in FIG. 2, a plurality of upper groove groups are formed in a lower surface of the upper load platform 1. Each of the upper groove groups includes two upper grooves 11. A first threaded through hole 12 is formed in each of the upper grooves. A plurality of lower groove groups are correspondingly formed in an upper surface of the lower foundation platform 2. Each of the lower groove groups includes two lower grooves. A second threaded through hole is formed in each of the lower grooves. An upper end of the single-leg vibration isolation unit 4 is clamped in the upper groove 11, and is fixed to the upper load platform 1 through the first threaded through hole 12. A lower end of the single-leg vibration isolation unit 4 is clamped in the lower groove, and is fixed to the lower foundation platform 2 through the second threaded through hole.

Figure 3:
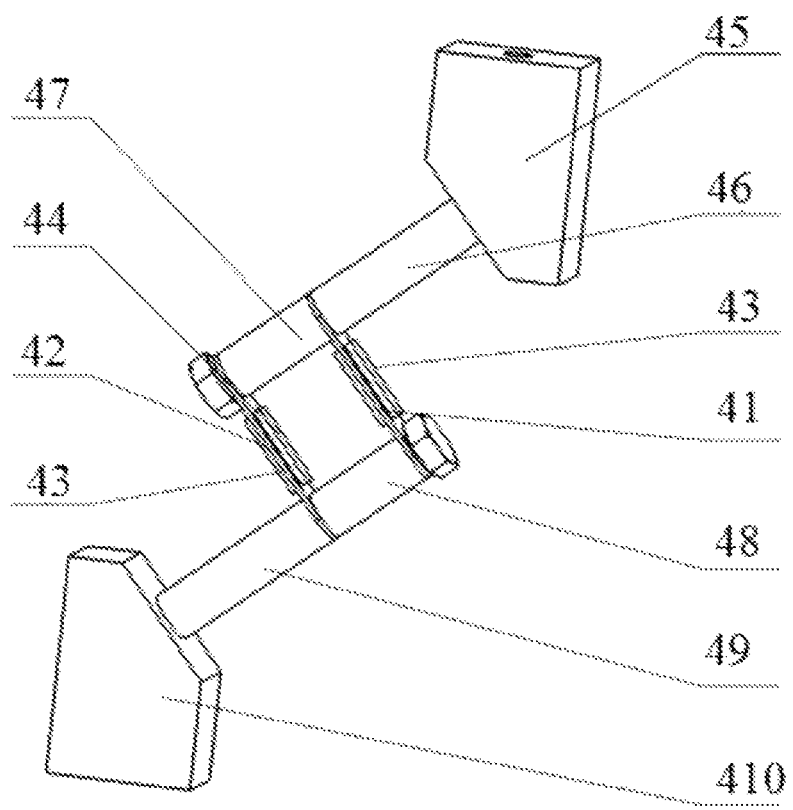
FIG. 3 is a structural schematic diagram of a single-leg vibration isolation unit provided by the present disclosure.

As shown in FIG. 3, the single-leg vibration isolation unit 4 includes an upper mounting corner seat 45, a first long mounting rod 46, a first short mounting rod 47, a first diaphragm spring 41, a second diaphragm spring 42, a second short mounting rod 48, a second long mounting rod 49, and a lower mounting corner seat 410. One side of the upper mounting corner seat 45 is fixedly connected to the lower surface of the upper load platform 1. The other side of the upper mounting corner seat 45 is fixedly connected to one end of the first long mounting rod 46. The other end of the first long mounting rod 46 is fixedly connected to one end of the first short mounting rod 47.

One side of the lower mounting corner seat 410 is fixedly connected to the upper surface of the lower foundation platform 2. The other side of the lower mounting corner seat 410 is fixedly connected to one end of the second long mounting rod 49. The other end of the second long mounting rod 49 is fixedly connected to one end of the second short mounting rod 48.

One end of the first diaphragm spring 41 is fixed between the first long mounting rod 46 and the first short mounting rod 47. The other end of the first diaphragm spring 41 is fixed to the other end of the second short mounting rod 48 by a bolt.

One end of the second diaphragm spring 42 is fixed between the second long mounting rod 49 and the second short mounting rod 48. The other end of the first diaphragm spring 42 is fixed to the other end of the second short mounting rod 47 by a bolt.

The MFC sensors 44 are pasted on the opposite sides of the first diaphragm spring 41 and the second diaphragm spring 42. The MFC actuators 43 are pasted on the other sides of the first diaphragm spring 41 and the second diaphragm spring 42.

External screw threads are formed in one end of each of the first long mounting rod 46, the first short mounting rod 47, the second long mounting rod 49, and the second short mounting rod 48. A first threaded hole with internal screw threads is formed in the other end of each of the first long mounting rod 46, the first short mounting rod 47, the second long mounting rod 49, and the second short mounting rod 48.

Figure 5:
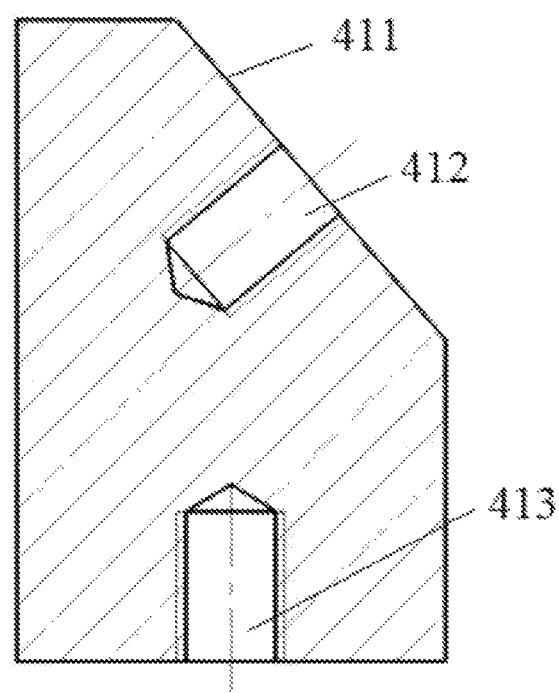
FIG. 5 is a sectional view of a mounting corner seat provided by the present disclosure.

As shown in FIG. 5, both the upper mounting corner seat 45 and the lower mounting corner seat 410 are prismatic structures with chamfered cross sections 411. The chamfered cross section is a cross section formed by crosscutting a first straight line on an end surface of a prismatic structure and a second straight line on a side surface of a prism. The first straight line is parallel to the second straight line. A second threaded hole 412 is formed in the chamfered cross section 411. The second threaded hole 412 is used to fix one end of the first long mounting rod 46 or the second long mounting rod 49. A third threaded hole 413 is formed in a non-crosscutting end surface of the prismatic structure. The third threaded hole 413 is used to fix the upper mounting corner seat 45 to the lower surface of the upper load platform 1 or fix the lower mounting corner seat 410 to the upper surface of the load foundation platform 2.

Figure 4:
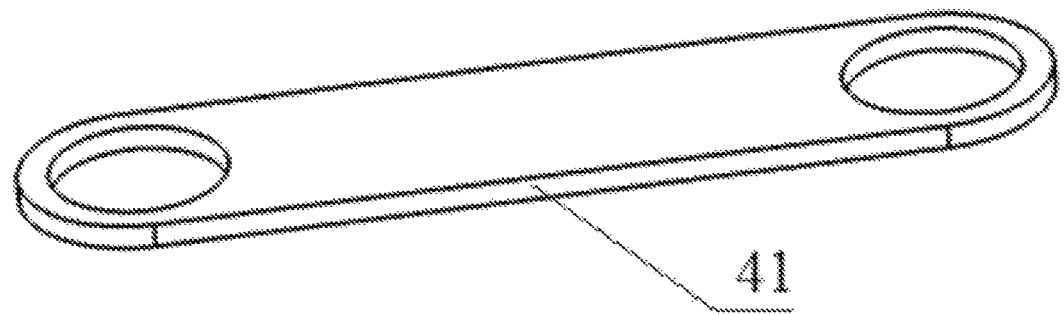
FIG. 4 is a three-dimensional structural diagram of a diaphragm spring provided by the present disclosure.

As shown in FIG. 4, both the first diaphragm spring 41 and the second diaphragm spring 42 are of plate beam structures. Through holes are formed in two ends of each plate beam structure. In a single-leg vibration isolation unit, there two diaphragm springs in total (the first diaphragm spring 41 and the second diaphragm spring 42). Basic structures thereof are plate beams. Through holes are formed in two sides of each of the diaphragm springs. The diaphragm springs are fixed through two rows of mounting rods. The MFC is pasted on two sides of each diaphragm spring. The two MFC plates on the inner side are used as sensors, that is, the MFC sensors, and are used to collect diaphragm spring deformation signals. The two MFC plates on the outer side are used as actuators, that is, the MFC actuators, and are used to counteract deformation quantities of the diaphragm springs through an external controller, so as to achieve an effect of active vibration isolation.

Figure 6:
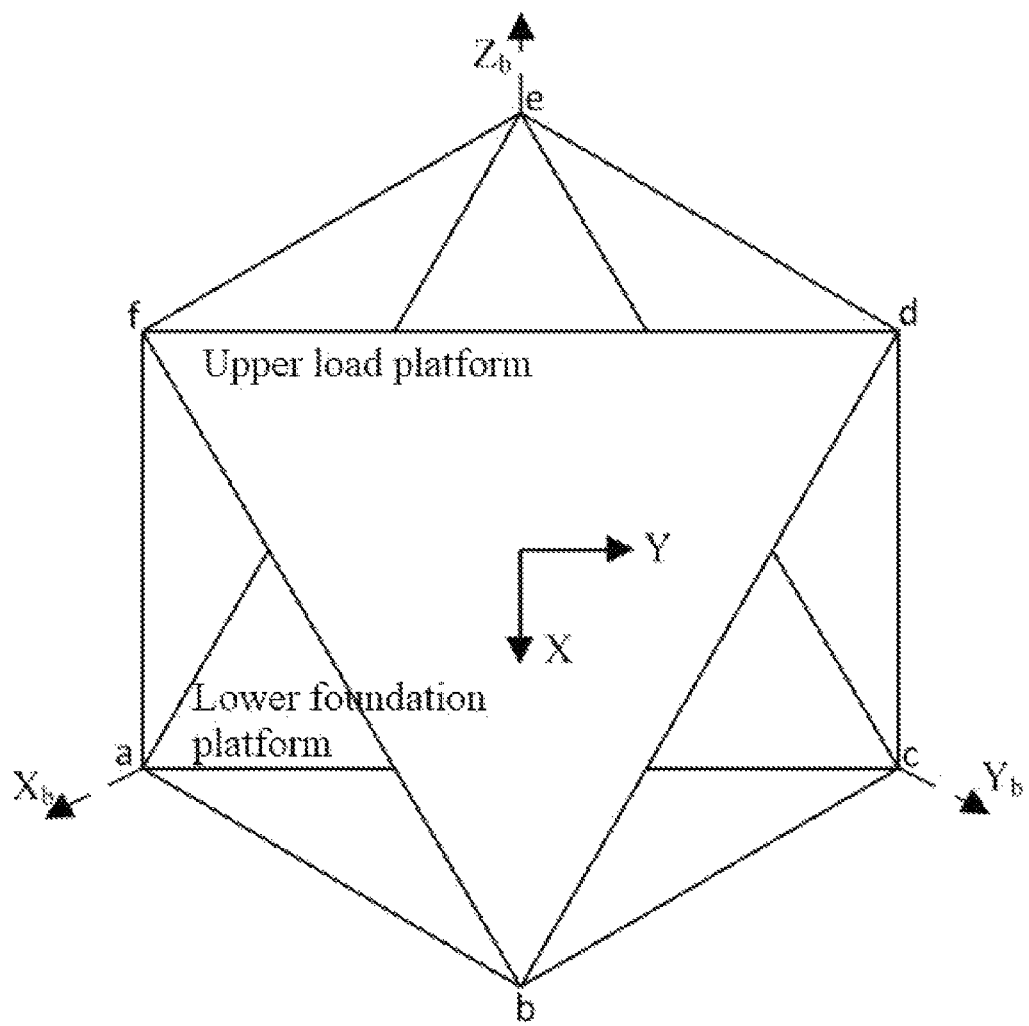
FIG. 6 is a schematic diagram of a geometric principle of the Stewart vibration isolation platform with the MFC plates provided by the present disclosure.

FIG. 6 is a schematic diagram of a principle of the Stewart vibration isolation platform with the MFC plates of the present disclosure. A study of a parallel vibration isolation structure adopts a Stewart platform parallel mechanism relying on six legs (six degrees of freedom a, b, c, d, e, and f), which consists of an upper load platform 1, a lower foundation platform 2, and six single-leg vibration isolation units 4 that are completely the same in a certain structural form. $X_b$, $Y_b$, and $Z_b$ in FIG. 6 are three coordinate axis directions. When the platform moves in an X/Y direction in FIG. 6, the present disclosure adopts spatial cube configuration, and movement among the single-leg vibration isolation units are independent of each other and are not coupled with each other.

The upper load platform, the single-leg vibration isolation units, and the lower foundation formation of the present disclosure may form a passive vibration isolation platform.

The MFC plates (MFC sensors and MFC actuators) are pasted on the two sides of the diaphragm springs of the present disclosure, so that the diaphragm spring deformation signals can be collected, and an effect of active vibration isolation can be achieved through an external controller.

During actual working, a micro-vibration signal is transmitted to the lower foundation platform through an excitation source. The lower foundation platform, the mounting corner seats (including the upper mounting corner seat and the mounting corner seat), and the mounting rods (including the first long mounting rod, the first short mounting rod, the second long mounting rod, and the second short mounting rod) may be equivalently regarded as rigid bodies to transfer the vibration to the diaphragm springs. The diaphragm springs dissipate vibration energy continuously through rapid micro-vibration and simultaneously transfer the vibration to the upper load platform. The size and material of the diaphragm springs may be selected according to different application scenarios. In active control, diaphragm spring vibration signals are collected through the MFC plates (MFC sensors), and MFC plates (MFC actuators) are driven to generate an actuating force to counteract the vibration of the diaphragm springs through an output action of the controller, so as to prevent the transferring of the vibration.

Figure 7A:
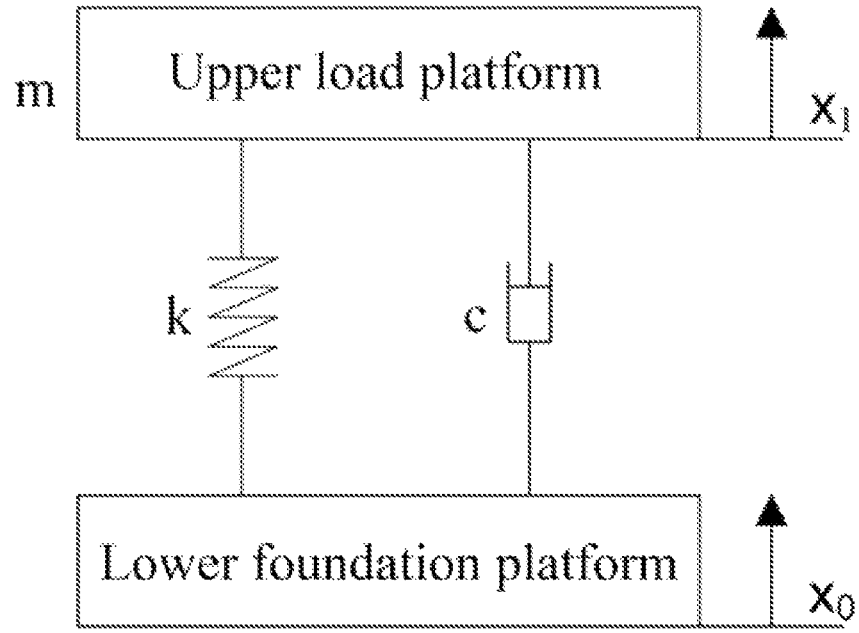
FIGS. 7A and 7B are a comparison diagram of action mechanisms provided by the present disclosure.

As shown in FIG. 7A, the action mechanism of a traditional passive vibration isolation platform is that: the traditional passive vibration isolation platform consists of mass-damping-stiffness units and realizes passive vibration isolation. A transfer function is that:

$$G = \frac{X_1}{X_0} = \frac{Cs + K}{Ms^2 + Cs + K}$$

In the formula, $X_1$ is the vibration response displacement of the upper load platform, $X_0$ is the initial excitation displacement of the lower foundation platform, M is the mass of the upper load platform, C is the equivalent damping of the mechanism, and K is the equivalent stiffness of the mechanism. The formula is expressed in a complex field, and s is a variable.

Figure 7B:
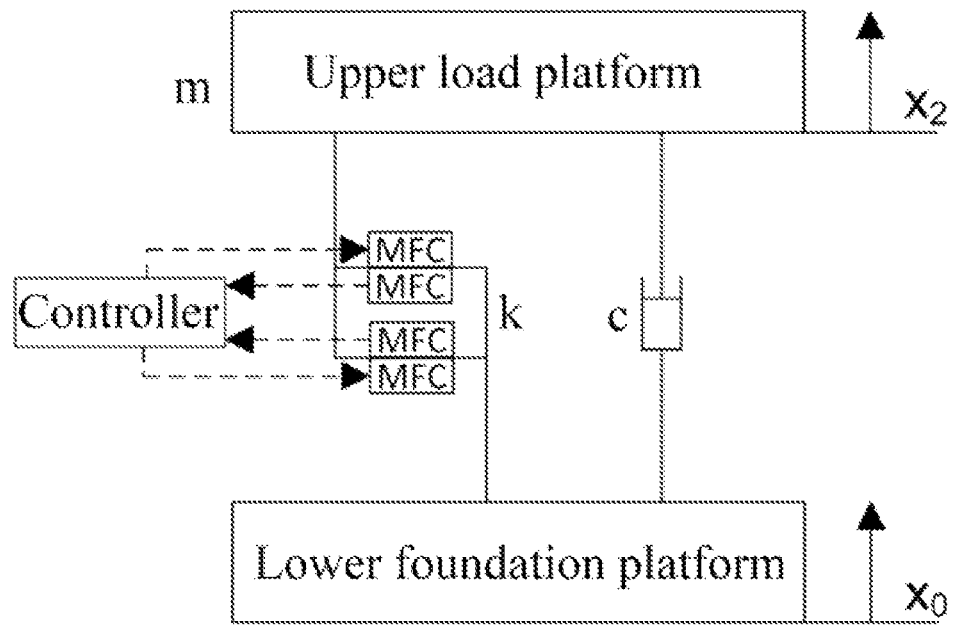

FIG. 7B is a schematic diagram of an action mechanism of the Stewart vibration isolation platform with the MFC plates of the present disclosure. Compared with the traditional passive vibration isolation platform, the present disclosure adopts a manner of combining the diaphragm springs and the MFC. The vibration signals are collected through the MFC plates on the inner side, and the external controller acts on the MFC plates on the outer side, so as to suppress the vibration of the diaphragm springs.

The present disclosure further provides a control method of a Stewart vibration isolation platform with MFC plates, which is applied to the vibration isolation platform. The control method of the present disclosure includes the following steps: collecting deformation vibration signals; calculating a control output signal; and controlling the transfer of an output quantity. In the step of collecting the deformation vibration signals, the vibration deformation signals of the diaphragm springs are collected through the MFC plates (MFC sensors) on the inner sides of the diaphragm springs and are transferred to the controller through wires. In the step of calculating the control output signal, actual control quantity is obtained through an RBF neural network algorithm, a PI force control algorithm, an adaptive RLS algorithm and/or an adaptive LMS algorithm, and is output. In the step of transferring, the control quantity output by the controller is transferred to the MFC actuators, so as to drive the MFC actuators to make a response to the vibration of the diaphragm springs.

Specifically, the control method includes the following steps that: the vibration deformation signals collected by the MFC sensors on each first diaphragm spring and each second diaphragm spring are acquired. The two MFCs (the MFC sensors) located on the inner sides of the diaphragm springs respectively collect the vibration signals of the first diaphragm spring and the second diaphragm spring under external excitation. When the diaphragm springs deform, MFC sensors will generate correspond a corresponding quantity of charge. The greater the deformation is, the more charge will be generated. The collected deformation semaphore $q_i$ (i=0, . . . , 12) is transferred to the controller through the wires.

A control quantity required for eliminating each vibration deformation signal is determined by the RBF neural network algorithm, the PI force control algorithm, the adaptive RLS algorithm and/or the adaptive LMS algorithm. The diaphragm spring deformation signal $q_i$ is input into the controller, and the control output signal, i.e., the control quantity $S_i$ (i=0, . . . , 12), is obtained through an active control algorithm. The output control quantity Si acts on the two MFC plates (MFC actuators).

The MFC actuators on each of the first diaphragm springs and each of the second diaphragm springs are respectively controlled according to the control quantities required for eliminating each of the vibration deformation signals.

The two control quantities output by the controller are respectively transferred to the corresponding MDC actuators, so as to drive the MFC actuators to generate actuating force to recover original deformation of the diaphragm springs, thereby performing active vibration isolation control of the single-leg vibration isolation unit.

Figure 8:
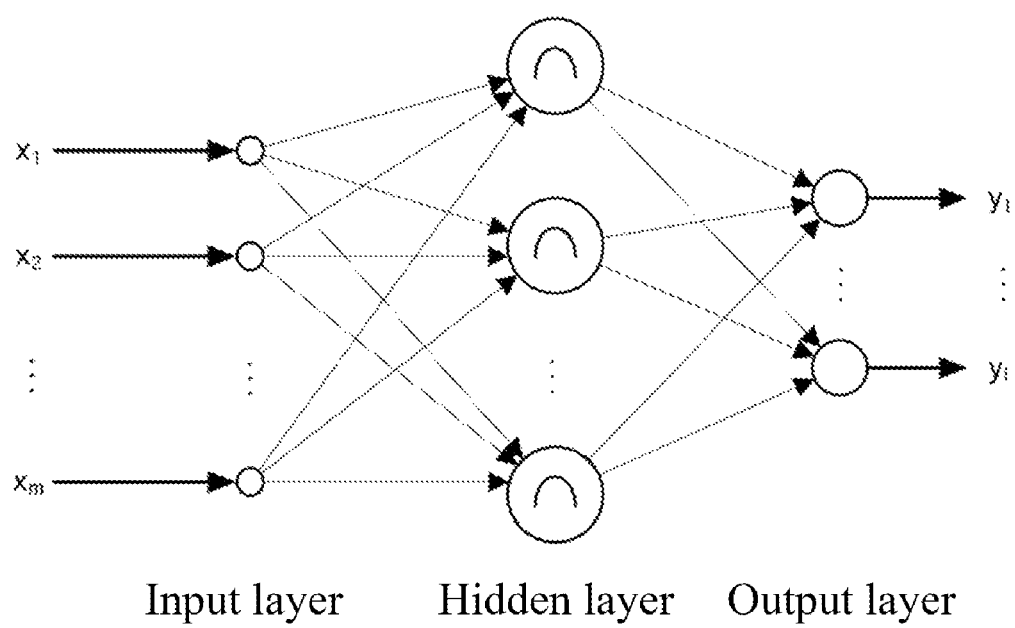
FIG. 8 is a structural schematic diagram of an RBF neural network provided by the present disclosure.

As shown in FIG. 8, the RBF neural network of the present disclosure is a local approximation neural network, and includes an input layer, a hidden layer, and an output layer. A node of the input layer transfers an input signal to the hidden layer, a node transfer function of the hidden layer selects a Gaussian function, a node of the input layer is a simple linear function, and an original system may be approximated through the RBF neural network.

In the RBF neural network, $X = [X_1, X_2, \ldots, X_n]^T$ is a network input, and $h_j$ is an output of a jth neuron of the hidden layer. That is:

$$hj = \exp\left(-\frac{\|x - cj\|^2}{2b_j^2}\right), j = 1, 2, \ldots, m$$

Where, $c_j = [c_{j1}, \ldots, c_{jn}]^T$ is a center point vector value of the jth hidden layer neuron, and the width vector of the Gaussian function is $b=[b_1, \ldots, b_m]^T$, and the weight value of the network is $w=[w_1, \ldots, w_m]^T$.

The output of the RBF network is:

$$y_m(t)=w_1h_1+w_2h_2+\ldots w_mh_m$$

Figure 9:
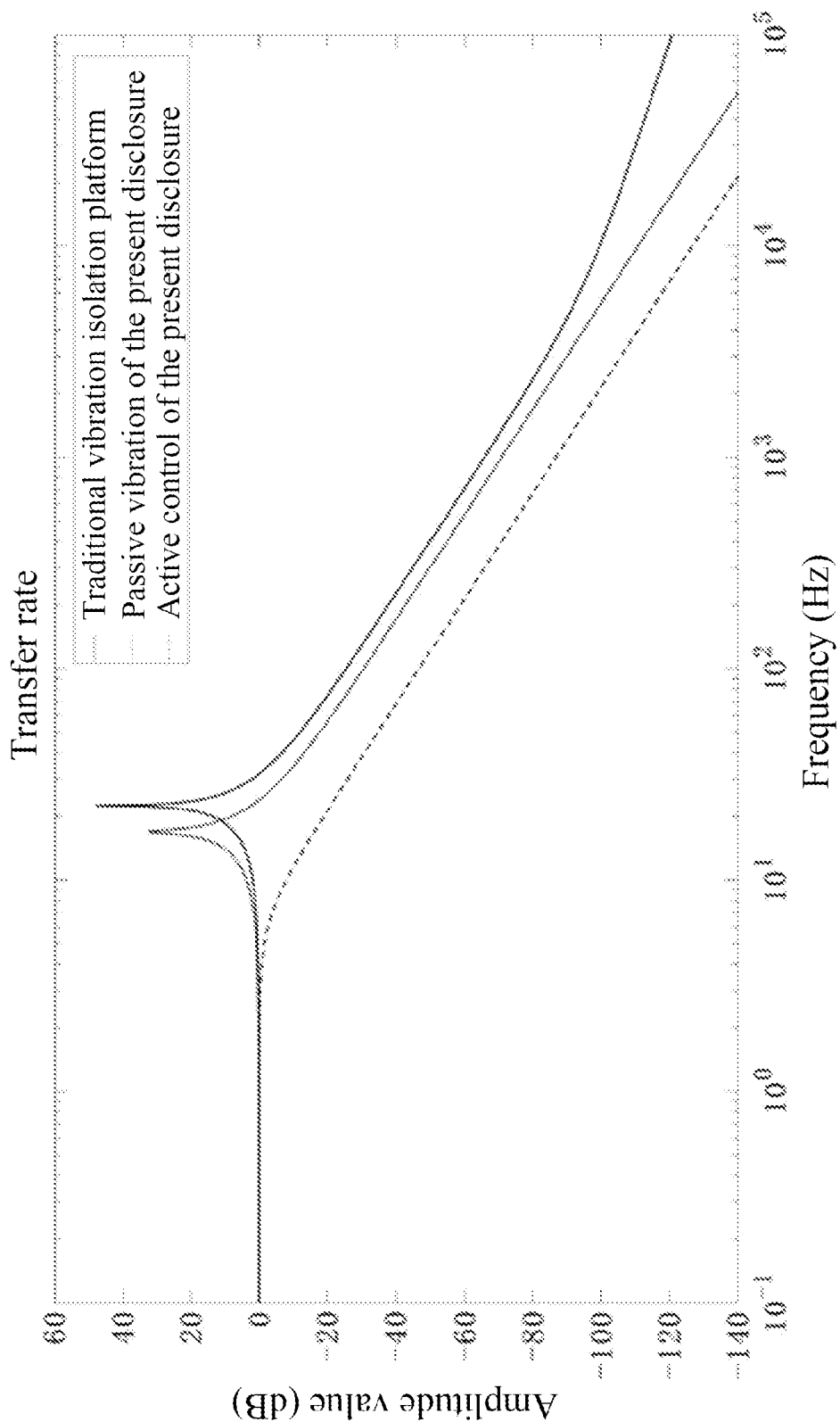
FIG. 9 is a comparison diagram of transfer rate curves of different vibration isolation platforms provided by the present disclosure.

FIG. 9 is a comparison diagram of transfer rate curves of the traditional vibration isolation platform, passive vibration isolation of the present disclosure, and the present disclosure under active control. It can be seen from a solid line in FIG. 9 that a peak value of the traditional vibration isolation platform is high at resonance, the inherent frequency is relatively backward, and the attenuation at a high frequency is also poor. It can be seen from a dotted line in FIG. 9 that the inherent frequency of the vibration platform of the present disclosure under passive vibration isolation, the peak value of a resonance peak is low, the vibration isolation bandwidth is wide, and a good vibration isolation effect can be achieved. It can be seen from a dashed line in FIG. 9 that, under the active control of the vibration platform of the present disclosure, the MFC plates are pasted on the diaphragm springs, feedforward active control is realized through the RBF neural network algorithm, and the high attenuation at the high frequency is ensured, and meanwhile, the peak value of the resonance peak is suppressed.

According to specific embodiments provided by the present disclosure, the present disclosure discloses the following technical effects.

The vibration isolation platform of the present disclosure is compounded by an active vibration isolation unit and a passive vibration isolation unit. The upper load platform, the lower foundation platform, the diaphragm springs, the mounting rods, and the mounting corners seats form the passive vibration isolation unit together. A piezoelectric brake, the MFCs (the MFC sensors and the MFC actuators), and the controller form a closed-loop active vibration isolation unit.

In the passive vibration isolation units, it is often necessary to select diaphragm springs with different stiffness properties according to the vibration isolation requirements. The diaphragm springs need to be adapted to the sizes of the MFCs. A groove surface is formed in the annular platform to achieve a positioning effect on the single-leg vibration reduction unit.

In the active vibration isolation unit, the two MFCs located on the inner side of the diaphragm springs are used as strain sensors. The MFCs have the characteristics of directional driving and sensing, and can be embedded at any time. The MFCs transfer the collected vibration signals to the controller. The controller processes the input signal according to the active control algorithm to obtain a real-time control quantity, and outputs the real-time control quantity to the piezoelectric actuators. Finally, the control quantity is applied to the two MFCs on the outer sides to produce micro-deformation to counteract the vibration, reduce the vibration of the load platform, and achieves an effect of suppressing the vibration.

The vibration isolation platform of the present disclosure is simple in structure and low in maintenance cost, the control method is easy to implement, the inherent frequency of the system can be reduced, and the high attenuation at high frequency is realized.

Various embodiments in the present specification are described in a progressive manner. Each embodiment focuses on differences from other embodiments, and the same and similar parts of various embodiments may be referred to one another.

In this specification, specific examples are used to describe the principle and implementation manners of the present disclosure. The description of the embodiments above is merely intended to help understand the method and core idea of the present disclosure. In addition, those skilled in the art may make modifications based on the idea of the present disclosure with respect to the specific implementation manners and the application scope. In conclusion, the contents of the present specification shall not be construed as a limitation to the present disclosure.

What is claimed is:

1. A Stewart vibration isolation platform with Macro Fiber Composite (MFC) plates, comprising: an upper load platform, a lower foundation platform, a controller, and a plurality of single-leg vibration isolation unit groups arranged between the upper load platform and the lower foundation platform, wherein each of the single-leg vibration isolation unit groups comprises two single-leg vibration isolation units;
the single-leg vibration isolation unit comprises a first diaphragm spring and a second diaphragm spring; an MFC actuator and an MFC sensor are respectively arranged on two sides of each of the first diaphragm springs and the second diaphragm springs; and
the MFC actuators and the MFC sensors are all connected to the controller.

2. The Stewart vibration isolation platform with the MFC plates according to claim 1, wherein there are three single-leg vibration isolation unit groups; and the three single-leg vibration isolation unit groups are distributed in the peripheral direction of the upper load platform and the lower foundation platform.

3. The Stewart vibration isolation platform with the MFC plates according to claim 1, wherein a plurality of upper groove groups are formed in a lower surface of the upper load platform; each of the upper groove groups comprises two upper grooves; a first threaded through hole is formed in each of the upper grooves; a plurality of lower groove groups are correspondingly formed in an upper surface of the lower foundation platform; each of the lower groove groups comprises two lower grooves; a second threaded through hole is formed in each of the lower grooves;
an upper end of the single-leg vibration isolation unit is clamped in the upper groove, and is fixed to the upper load platform through the first threaded through hole; and a lower end of the single-leg vibration isolation unit is clamped in the lower groove, and is fixed to the lower foundation platform through the second threaded through hole.

4. The Stewart vibration isolation platform with the MFC plates according to claim 1, wherein the single-leg vibration isolation unit comprises an upper mounting corner seat, a first long mounting rod, a first short mounting rod, a first diaphragm spring, a second diaphragm spring, a second short mounting rod, a second long mounting rod, and a lower mounting corner seat;
one side of the upper mounting corner seat is fixedly connected to the lower surface of the upper load platform; the other side of the upper mounting corner seat is fixedly connected to one end of the first long mounting rod; the other end of the first long mounting rod is fixedly connected to one end of the second short mounting rod;

one side of the lower mounting corner seat is fixedly connected to the upper surface of the lower foundation platform; the other side of the lower mounting corner seat is fixedly connected to one end of the second long mounting rod; the other end of the second long mounting rod is fixedly connected to one end of the second short mounting rod;

one end of the first diaphragm spring is fixed between the first long mounting rod and the first short mounting rod; the other end of the first diaphragm spring is fixed to the other end of the second short mounting rod by a bolt;

one end of the second diaphragm spring is fixed between the second long mounting rod and the second short mounting rod; the other end of the second diaphragm spring is fixed to the other end of the first short mounting rod by a bolt;

the MFC sensors are pasted on the opposite sides of the first diaphragm spring and the second diaphragm spring; and the MFC actuators are pasted on the other sides of the first diaphragm spring and the second diaphragm spring.

5. The Stewart vibration isolation platform with the MFC plates according to claim 4, wherein external screw threads are formed in one end of each of the first long mounting rod, the first short mounting rod, the second long mounting rod, and the second short mounting rod; and a first threaded hole with internal screw threads is formed in the other end of each of the first long mounting rod, the first short mounting rod, the second long mounting rod, and the second short mounting rod.

6. The Stewart vibration isolation platform with the MFC plates according to claim 4, wherein both the upper mounting corner seat and the lower mounting corner seat are prismatic structures with chamfered cross sections;

the chamfered cross section is a cross section formed by crosscutting a first straight line on an end surface of a prismatic structure and a second straight line on a side surface of a prism; the first straight line is parallel to the second straight line;

a second threaded hole is formed in the chamfered cross section; the second threaded hole is used to fix one end of the first long mounting rod or the second long mounting rod;

a third threaded hole is formed in a non-crosscutting end surface of the prismatic structure; and the third threaded hole is used to fix the upper mounting corner seat to the lower surface of the upper load platform or fix the lower mounting corner seat to the upper surface of the load foundation platform.

7. The Stewart vibration isolation platform with the MFC plates according to claim 4, wherein both the first diaphragm spring and the second diaphragm spring are of plate beam structures; and through holes are formed in two ends of each plate beam structure.

* * * * *